E. A. PETERSON.
KNIFE FOR CUTTING BROOM CORN.
APPLICATION FILED MAR. 18, 1911.
998,118.
Patented July 18, 1911.
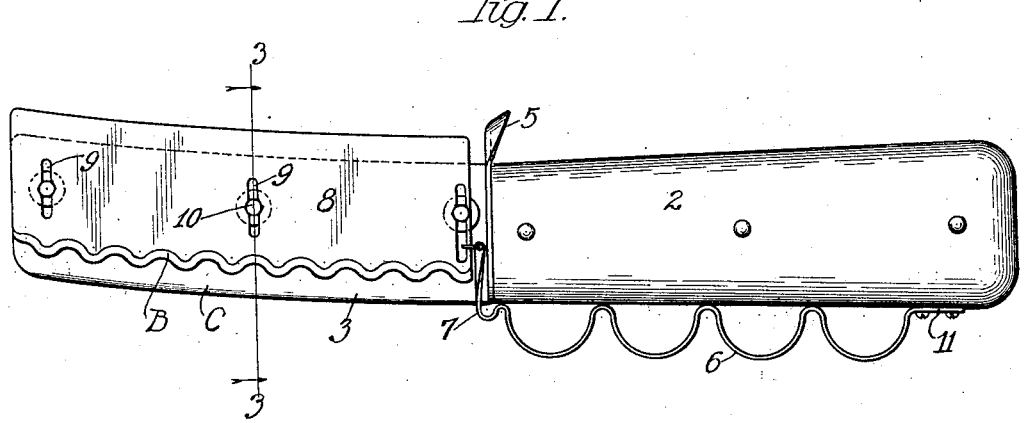
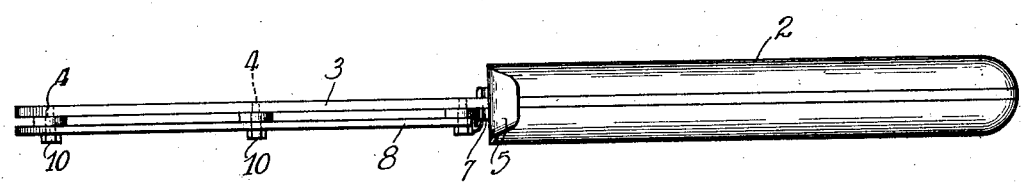
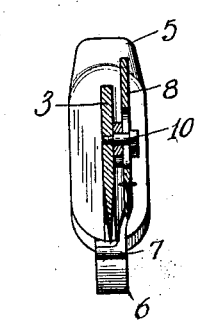

UNITED STATES PATENT OFFICE.

EMIL A. PETERSON, OF FALUN, KANSAS.

KNIFE FOR CUTTING BROOM-CORN.

998,118.  Specification of Letters Patent.  Patented July 18, 1911.

Application filed March 18, 1911. Serial No. 615,335.

*To all whom it may concern:*

Be it known that I, EMIL A. PETERSON, a citizen of the United States, residing at Falun, in the county of Saline and State of Kansas, have invented certain new and useful Improvements in Knives for Cutting Broom-Corn, of which the following is a specification.

This invention relates to knives for cutting broom corn and its object is to produce a knife of this class that is simple in construction, durable and efficient.

With the foregoing and other objects in view the invention consists in the combination and arrangement of parts to be hereinafter fully described in the following specification, pointed out in the claims and illustrated in the accompanying drawing which forms a part of said specification and in which—

Figure 1 is a side elevation of the knife. Fig. 2 is a plan. Fig. 3 is a cross section on line 3—3 of Fig. 1.

Like reference characters indicate corresponding parts throughout the several views.

2 is the handle of the knife provided with a stout blade 3 having a cutting edge C and provided with a plurality of apertures 4. A suitable thumb rest 5 is provided on the upper extremity of the handle adjacent the blade and upon its under side a piece of resilient material 6, secured to the handle at 11, is bent to form suitable finger rests and extended beyond said rests as at 7 to engage an auxiliary blade 8 which is provided with a series of vertical slots 9 in alinement with the apertures 4 of the main blade 3 to which blade the blade 8 is secured by screws 10 fitting in the alined apertures in a manner to permit independent vertical movement of the blade 8 with relation to the blade 3.

The blade 8 is provided with a scalloped cutting edge B which edge is very thin and adapted to cut the leaves of the broom corn. In operation the knife is taken in one hand while the corn stalk is taken in the other. When the knife is brought in contact with the growing broom corn the first thing encountered is the leaves and to cut the same the fingers of the operator resting in the finger rests are pressed away from the handle which will draw the cutting edge of the auxiliary blade 8 below the cutting edge of the main blade 3 to cut the leaves; when the leaves are cut away to the stem the pressure on the resilient finger rests is removed when the blade 8 will be forced into the position shown in Fig. 1 which permits the stout main blade to sever the stem when the auxiliary blade may again be drawn into operative position to cut the leaves beyond the stem.

What is claimed is:—

1. In a knife, a handle provided with a thumb rest, an apertured main blade secured to said handle, a slotted auxiliary blade secured to said main blade and resilient finger rests connecting the knife handle and the said auxiliary blade for moving the latter independently of the main blade.

2. In a knife, a handle provided with a thumb rest, an apertured main blade rigidly secured to said handle, an auxiliary blade having vertically disposed slots in alinement with the apertures in the main blade, screws connecting the two blades through the medium of their alined openings in a manner to permit the independent vertical movement of the said auxiliary blade and resilient finger rests connecting the knife handle and auxiliary blade for actuating the latter member.

In testimony that I claim the foregoing as my own I have hereto affixed my signature in the presence of two subscribing witnesses.

EMIL A. PETERSON.

Witnesses:
C. T. JOHNSON,
WALFRED JOHNSON.

Copies of this patent may be obtained for five cents each, by addressing the "Commissioner of Patents, Washington, D. C."